E. D. TUBBS.
SHAFT COUPLING.
APPLICATION FILED NOV. 8, 1920. RENEWED DEC. 30, 1921.
1,406,247.
Patented Feb. 14, 1922.
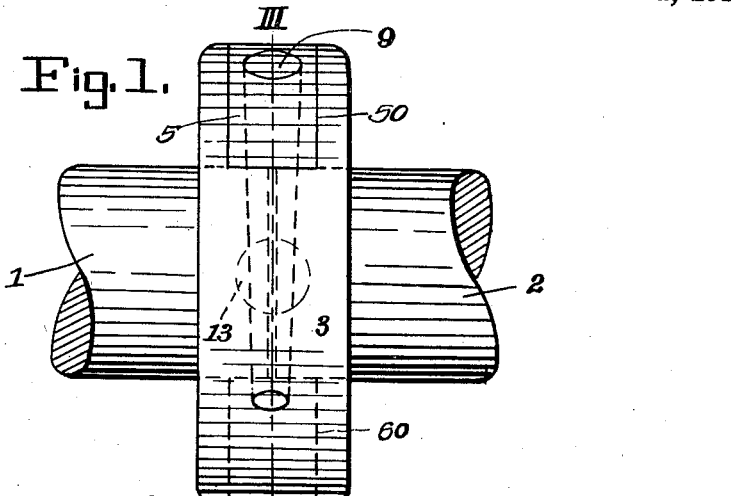
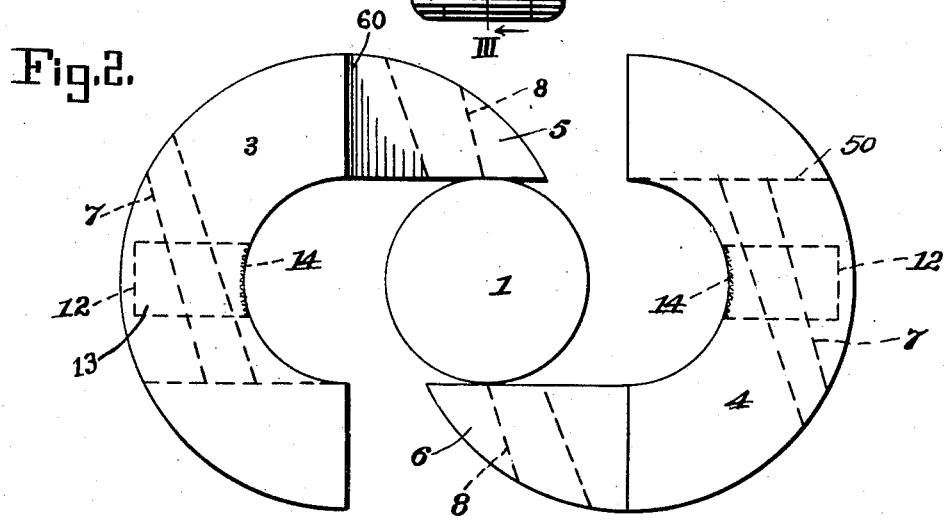
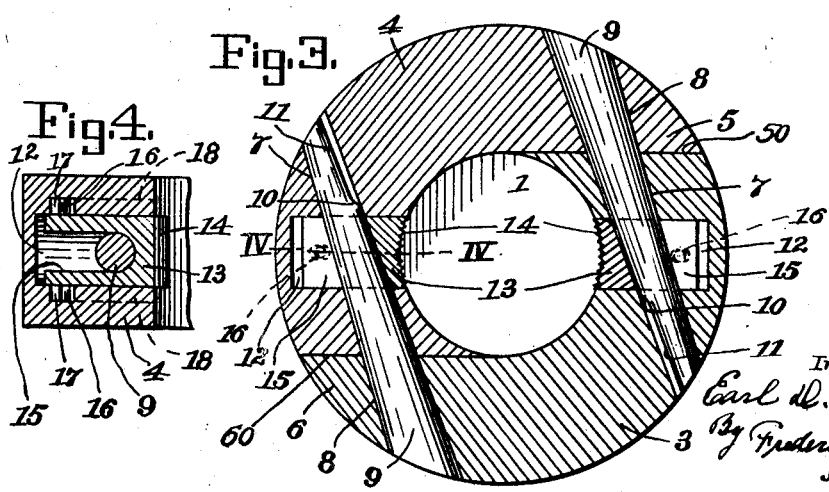
Inventor,
Earl D. Tubbs,
By Frederick V. Winters
Attorney.

UNITED STATES PATENT OFFICE.

EARL D. TUBBS, OF NEW YORK, N. Y., ASSIGNOR TO IGOE BROTHERS, OF NEWARK, NEW JERSEY, A CORPORATION OF NEW JERSEY.

SHAFT COUPLING.

1,406,247.  Specification of Letters Patent.  Patented Feb. 14, 1922.

Application filed November 8, 1920, Serial No. 422,456. Renewed December 30, 1921. Serial No. 525,976.

*To all whom it may concern:*

Be it known that I, EARL D. TUBBS, a citizen of the United States, and resident of New York, in the county and State of New York, have invented certain new and useful Improvements in Shaft Couplings, of which the following is a full, clear, and exact specification.

This invention relates to shaft couplings and has for its object to provide an improved and simplified device for rigidly fastening the ends of shafts together.

Special objects are to reduce the number of parts of the coupling and the size of the complete device, to eliminate all external obstructions which might cause injury to workmen or their clothing, and to provide very simple means for locking the parts of the coupling together and clamping them upon the ends of the shafts to be connected.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a side elevation of the end portions of two shafts connected together by a coupling constructed substantially in accordance with this invention.

Figure 2 is an elevation of the coupling with its supplemental sections separated as when they are being placed around the shaft ends.

Figure 3 is a section on the line III—III of Figure 1, and

Figure 4 is a section on the line IV—IV of Figure 3.

The end portions of two shafts to be connected are indicated at 1 and 2 in Figure 1 as extending into the coupling which comprises two supplemental ring sections 3 and 4 each being semi-circular and having a tongue or tenon 5 and 6, respectively, on one end, and a corresponding recess or mortise 50 and 60, respectively, on the other end into which said tongues or tenons are adapted to fit when the sections are assembled around the ends of the shafts, so as to present a smooth periphery on the coupling and leave no projections which might cause injury to the workmen or their clothing.

Ways 8 are formed through the tongues or tenons and continuing ways 7 are formed in adjacent portions of the coupling sections, and in said ways are fitted keys 9 which are preferably tapered so as to make a tight fit and prevent rattling and displacement thereof in use. The ends of said keys or wedges 9 are shaped to conform to the surface or periphery of the coupling so as to offer no obstruction thereon.

Each of the sections 3 and 4 is radially bored from the inside, as at 12, to receive gripping members 13 which have serrated or corrugated inner ends 14 adapted to grip the ends of the shafts. Said gripping members are adapted to slide in said bores 12, and are limited in such movement and retained in the same when the sections are taken apart by pins 16 working in slots or grooves 17 in the walls of said bores. While such pins and grooves are shown on both sides of the gripping members in Figure 4, one such pin and groove on either side thereof will answer. The grooves may be cut or bored radially from the inside of the sections of the coupling and the outer portions of said grooves plugged up or filled in as indicated by the dotted line 18, Figure 4, in any suitable manner, after the gripping members with their pins have been inserted.

The gripping members 13 have notches 15 in line with the ways 7 and 8, and the keys are provided with inclined portions 10, leading from reduced end portions 11, to engage said notches in the gripping members and force the latter into gripping engagement with the ends of the shafts when the keys or wedges are driven in as shown in Figure 3. The wedges or keys thus serve the double purpose of locking the sections of the coupling together and forcing the gripping members into positive engagement with the ends of the shafts so that said shafts are effectually and rigidly fastened together.

It may also be noted that the device may be used as a collar for setting a shaft against a journal or bearing to prevent longitudinal or axial movement of the shaft and insure the proper positioning of a pulley on the shaft in its relation with a device to be driven.

Having thus described my invention, what I claim as new and desire to secure by Letters Patent of the United States is:—

1. In a shaft coupling, the combination with similar supplemental ring sections to surround the end portions of the shafts to be connected, each section having a recess in one end and a projecting tongue at the other end, said tongues fitting into said recesses when the sections are assembled about the shafts, of means for locking the sections together passed through each of said tongues and sections.

2. In a shaft coupling, the combination with supplemental ring sections to surround the end portions of the shafts to be connected, each section having a portion to interlock with the adjacent section, of gripping members mounted to slide in said sections, and means for locking said sections together and simultaneously moving said gripping members into position to grip the ends of the shafts.

3. In a shaft coupling, the combination with supplemental ring sections to surround the end portions of the shafts to be connected, of means for locking said sections together about the ends of the shafts, and gripping members movably mounted in said sections and adapted to be moved therein to grip the ends of the shafts when said sections are locked together.

4. In a shaft coupling, the combination with supplemental ring sections to surround the end portions of the shafts to be connected, of means for locking the sections together, gripping members carried by said sections, there being key ways in said sections, and keys to fit said ways, said keys having means for moving said gripping members into position to grip the ends of the shafts.

5. In a shaft coupling, the combination with supplemental ring sections to surround the end portions of the shafts to be connected, of means for locking the sections together, gripping members movably mounted in said sections, means for retaining said members in connection with their sections when the latter are separated from one another, and means for moving said members into position to grip the ends of the shafts and for holding them in that position.

6. In a shaft coupling, the combination with supplemental ring sections to surround the end portions of the shafts to be connected, of projecting tongues on said sections, there being ways in the sections to receive the tongues on the adjacent sections, gripping members movable in said sections, there being ways in said sections extending through the tongues and adjacent portions of the sections for locking the sections together, said ways also opening on the gripping members, and keys to fit said ways, said keys having inclined portions to engage the gripping members and force them into gripping contact with the ends of the shafts.

7. In a shaft coupling, the combination with supplemental ring sections to surround the end portions of the shafts to be connected, of projecting tongues on said sections, there being ways in the sections to receive and fit around said tongues leaving no obstructions on the outside of the coupling, gripping members carried by the sections on the inner faces thereof, there being bores for said members terminating short of the outer surfaces of the sections, and means for locking the sections together and for forcing the gripping members into position to grip the ends of the shafts.

In testimony whereof I have signed my name to this specification.

EARL D. TUBBS.